United States Patent Office 3,458,710
Patented July 29, 1969

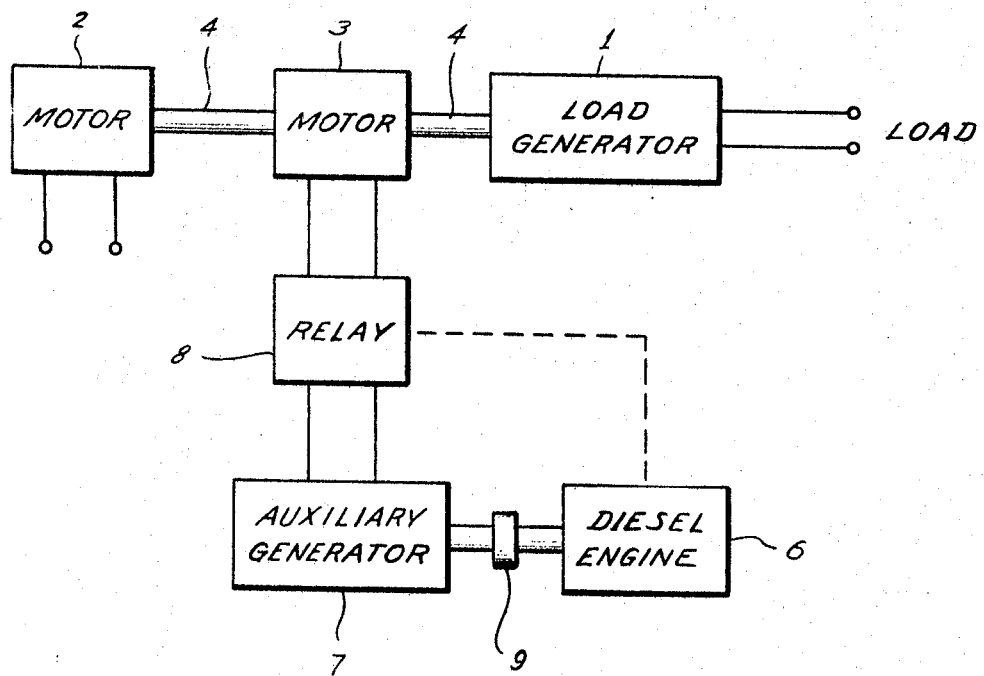

3,458,710
EMERGENCY POWER SYSTEM
Robert J. Dodge, Houston, Tex., assignor to Automatic Power, Inc., a corporation of Delaware
Filed Apr. 6, 1966, Ser. No. 540,697
Int. Cl. H02p 9/04; F02d 29/06; H02k 7/18
U.S. Cl. 290—4                                       6 Claims

ABSTRACT OF THE DISCLOSURE

In an emergency power system providing an uninterrupted power source despite interruptions in power input to the system having an electric generator for supplying energy to a load, a first motor adapted to be connected to a source of power external of the power system and a second motor for driving said generator, said generator and motors being shaft connected. Further, the system provides an auxiliary generator driven by a diesel engine for supplying said second motor via relay connection. Both motors being simultaneously energized with said second motor normally driving said generator and said first motor floating on the line. Upon malfunction of said auxiliary power supply, said auxiliary generator being decoupled from said second motor and said diesel engine being shut down.

---

This invention relates to an emergency power system wherein a generator is driven by either a prime or standby power source with the arrangement being such that shifting of the driving duty from one source to the other does not result in even a momentary interruption of power output from the generator.

It is customary in situations of critical electrical power requirements to provide an auxiliary power source which can be switched to and from the load in the event of commercial power failure or excessive power variation. In some situations, however, the criticality of the load is such that interrutions or variations in power caused by such switching, although slight cannot be tolerated. For example, during the countdown period prior to launch of a space vehicle, it is very important that the power supply the load to the various computers and data equipment be uninterrupted. For this reason, commercial power alone is generally not considered sufficiently reliable during this period as to be the sole source of power as interruptions may occur or the load may vary as other users come on and off the line. It has been suggested that an auxiliary power source, not subject to varying external loads, be used to supply the load during this critical period (generally 72 hours prior to launch) and that the auxiliary source be switched in by suitable switch gear only upon failure of the commercial power. This has proven to be unsatisfactory, however, as continuous service is not provided in such a situation due to switching time albiet the latter may be only a few seconds.

A solution to this problem, it is contemplated by this invention to provide a system which utilizes two power sources, such as commercial power source and an auxiliary power source to drive an electrical generator, but in which no switch gear is employed to connect one source to drive the generator upon failure of the other source so that the power supplied by the generator to the load is not interrupted even momentarily. It is thus an object of this invention to provide an emergency power system which provides for the transfer or shifting of the driving duty of a generator from one power source to another without using electrical switch gear and in such a manner that power supplied by the generator is continuous.

Another object is to provide such a system in which a generator is driven by a prime and a standby motor with the latter normally merely "floating on the line" but when the prime motor slows down due to interruption or decrease of power to it, the standby motor automatically begins to draw current from its source and to supply driving power to the generator so that the output of the latter is not interrupted and does not fluctuate even momentarily.

Another object is to provide such a system in which the standby motor is driven by the prime motor and acts as a load on the prime motor when driven thereby at an excessive speed thereby tending to maintain the speed of the prime motor at a desired value.

Other objects, advantages and features of the invention will be apparent from a consideration of the specification, claims, and appended drawing. in which is shown an emergency power system embodying the invention.

In accordance with this invention, an electrical current generator is provided to supply energy to a load. The generator is driven by one of two motors which are connected to each other and to the generator at all times while the system is in operation. The first motor is adapted to be connected to an external source of power, such as a commercial power line, and has the characteristics of producing substantially no torque at a synchronous speed corresponding to the frequency of the external power source, but produces sufficient torque to drive the generator at speeds less than the synchronous speed referred to. The second motor has the characteristics of producing substantially all the torque required to drive the generator when driven at a speed substantially equal to the synchronous speed of the first motor. Then by providing an auxiliary power source which will cause the second motor to drive the generator and first motor at the latter's synchronous speed, the driving power will be supplied by the second motor and the first motor will merely "float on the line." However, upon failure of the auxiliary power system, in which case the second motor can no longer drive the generator and the first motor, the generator and first motor slow down slightly to a speed less than synchronous speed so that the first motor supplies the torque to drive the generator.

An important feature of this invention is that this transfer of generator drive occurs automatically upon failure of the auxiliary power source or second motor and there is no momentary interruption of energy supplied by the generator as would be the case if switch gear were employed. In fact, the system can be built so that no voltage fluctuations will occur in the generator's output. Other features will be discussed below.

Referring to the drawing, in which is shown a preferred embodiment of this invention, electrical current generator 1 can be a conventional alternating current generator producing, for example, 230 volts at 60 cycles per second when rotating at 1800 r.p.m. Driving motors 2 and 3 which are, respectively, the first and second motors mentioned above. A means is provided for drivingly connecting each of these motors to the generator 1 and to each other at all times so that motor 3 is always driving both the generator and motor 1. This means includes the shaft 4 connecting the motors 2 and 3 in tandem and in turn connecting the motors to the generator 1. Other suitable driving connections may be used.

The first motor 2 is connected to a suitable external source of power such as a commercial source supplying alternating current at 60 cycles per second. This motor has the characteristic of producing substantially no torque at its synchronous speed, but producing substantial torque at speeds less than synchronous speed. For example, if motor 2 is a 4 pole induction motor being driven by a 60 cycle source it has a synchronous speed of 1800 r.p.m. (frequency multiplied by 120 and divided by the number of poles equals synchronous speed). The torque output of the motor 2 is dependent upon the percentage slip between the rotor and the rotating field when the motor is running. At 1800 r.p.m. the motor is in a no slip condition and no torque is produced. However, at 1750 r.p.m., for example, a 2.77 percent slip is produced and substantial torque can be developed.

The second motor 3 can also be an induction motor, although other types of motors can be used as described below. This motor has a characteristic in this system of producing substantial torque at the synchronous speed of the first motor. If an induction motor is used for this motor, this can be accomplished by driving the motor with an alternating current having a frequency higher than the 60 cycles per second current driving the first motor. This causes the second motor to have a synchronous speed greater than the synchronous speed of motor 1. Thus if the motor 3 is a four pole induction motor and is driven by a 61 cycles per second current source, its synchronous speed at 61 cycles is 1830 and its slip while rotating at 1800 r.p.m. is 1.63 percent. The motor 3 should be chosen to produce sufficient torque at these figures to drive the generator 1 and the motor 2 at 1800 r.p.m.

The second motor 3 can be driven by an auxiliary source such as a diesel engine 6 driving an electrical current generator 7. If the second motor 3 is a four pole induction motor as described in the above example, the generator 7 can produce a 61 cycles per second alternating current to drive this motor. Thus, with the first motor 2 connected to the 60 cycle commercial power source and the second motor 3 connected to the auxiliary generator 7 at 61 cycles per second, the motor 3 will drive the motor 2 and the generator 1 at 1800 r.p.m. so that the motor 2 is producing no torque. Should the frequency of the generator 7 output drop off, however, the rotation of the motor 2 will be slowed and it will begin producing torque to drive the generator 1. The transfer of the driving torque from the motor 3 to the motor 2 is automatic and occurs without any switching.

Also, should diesel engine 6 tend to speed up, motor 2 will act as an induction generator and feed power back into the commercial power source. While it is acting as a generator, it is a load on the diesel engine tending to slow the latter down to the synchronous speed of motor 2. On the other hand, if the diesel engine slows down, motor 2 will begin to deliver torque to the generator thereby decreasing the load on engine 6 permitting it to speed up. Thus in effect, motor 2 functions as a speed regulator.

If the diesel engine 6 or the auxiliary generator should fail, motor 3 will continue to rotate but will act as an induction generator and will tend to feed power to the auxiliary generator 7 as the latter is slowing down. That is, as the auxiliary generator slows down, the resulting frequency of its output lowers so that the slip of motor 3 becomes negative and it acts as a generator. A reverse power relay 8 can be installed between motor 3 and generator 7 to sense this generator action and its output used to disconnect the auxiliary generator from motor 3 and to shut down the diesel engine. In some instances, it may be desirable to provide an over-running clutch 9 between engine 6 and generator 7 so that should the diesel engine slow down, it will be mechanically disconnected from generator 7. This eliminates the need for motor 2 to also drive the diesel engine at any time it falls below speed. It has been found that with this arrangement, there can be a complete shift in driving duty from motor 3 to motor 2 within 0.5 cycle of current being generated by generator 1. As a result, no change in voltage from generator 1 can be detected during this shift.

Also, relay 8 can be of the voltage sensing type and connected to the engine 6 to shut it down should the voltage from generator 7 fall below a predetermined level. In this case, shutting the engine down would declutch it from the generator 7 and the latter could remain connected to motor 3 as the only power loss would be windage and friction losses and this would not unduly burden motor 2.

Motors other than induction motors may be used for the second motor 3. For example, if a synchronous motor is employed, it will produce maximum torque at its synchronous speed. Thus, in the example given, the auxiliary power source should produce a 60 cycle per second alternating current to drive motor 3 and the generator 1 at 1800 cycles per second. Upon fall-off output of the generator 7, this speed will drop along with the torque output of motor 3. As this occurs, the motor 2 picks up torque as its shaft slows and drives the motor 3 and the generator 1. Again the transmission of driving torque is automatic and the output of generator 1 to the load is uninterrupted.

In the preferred embodiment shown, the auxiliary power source is a diesel engine 6 driving a generator 7. Other devices, such as an inverter, may be employed for this source.

It is evident from the above description that when the motor 3 is driving the generator 1, the external power source may vary in output or drop off completely without affecting the power to the load. Even when the motor 2 is driving the generator 1, the loads to the external source from other users may vary without affecting the power to the load from the generator 1. This is true as long as the power from the external power source is sufficient to cause the motor 2 to drive the generator 1.

From the foregoing, it will be seen that this invention is one well adapted to attain all of the ends and objects herein above set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An emergency power system providing an uninterrupted power source despite interruptions in power input to the system, comprising; an electrical current generator adapted to supply energy to a load; a first motor adapted to be connected to a source of power external of the power system, said first motor producing substantially no torque at a synchronous speed corresponding to the frequency of said external power source and producing substantial torque at speeds less than said synchronous speed; a second motor having characteristics such as to produce substantially all the torque required to drive said generator when driven at a speed substantially equal to the synchronous speed of the first motor; means connecting said motors to said generator to provide a driving connection between each of said motors and said generator at all times during operation; and an auxiliary power source connected to said second motor and generating alternating current at a predetermined frequency of a value to cause said second motor to drive said first motor at said synchronous speed while at the same time producing sufficient torque to drive said generator whereby upon failure of said auxiliary power source the driving power to said generator is automatically transmitted from said second motor to said first motor and the energy supplied by said generator is uninterrupted.

2. The power system of claim 1 in which said first and second motors are four pole induction motors and said first motor having a synchronous speed corresponding to 60 cycle per second current and said predetermined frequency is 61 cycles per second.

3. The power system of claim 2 in which the auxiliary power source includes an internal combustion engine driving a second generator which produces alternating current at 61 cycles per second.

4. The power system of claim 1 in which the auxiliary power source includes an internal combustion engine driving a second generator which produces alternating current at said predetermined frequency.

5. The power system of claim 1 wherein said first motor is an induction motor.

6. The power system of claim 5 wherein said second motor is a synchronous motor and said auxiliary power source produces 60 cycle per second current to drive the second motor, said first motor having a synchronous speed corresponding to 60 cycles per second.

References Cited

UNITED STATES PATENTS 3,191,050   6/1965   Park _____ 290—30 XR
3,283,165   11/1966  Bloch _____ 290—30 XR ORIS L. RADER, Primary Examiner G. R. SIMMONS, Assistant Examiner U.S. Cl. X.R.

290—30; 322—9